(12) United States Patent
Schmidt et al.

(10) Patent No.: US 9,329,027 B2
(45) Date of Patent: May 3, 2016

(54) MEASURING UNIT, MEASURING SYSTEM AND METHOD FOR DETERMINING A RELATIVE POSITION AND RELATIVE ORIENTATION

(75) Inventors: Oliver Schmidt, Erlangen (DE); Christian Koos, Karlsruhe (DE); Bernd Spruck, Mögglingen (DE); Frank Höller, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 591 days.

(21) Appl. No.: 13/818,242

(22) PCT Filed: Jul. 26, 2011

(86) PCT No.: PCT/EP2011/062787
§ 371 (c)(1),
(2), (4) Date: May 6, 2013

(87) PCT Pub. No.: WO2012/028388
PCT Pub. Date: Mar. 8, 2012

(65) Prior Publication Data
US 2013/0215435 A1    Aug. 22, 2013

(30) Foreign Application Priority Data
Aug. 30, 2010  (DE) .................. 10 2010 039 948

(51) Int. Cl.
| | |
|---|---|
| *G01B 11/24* | (2006.01) |
| *G01B 11/14* | (2006.01) |
| *G01B 11/26* | (2006.01) |
| *G01B 11/00* | (2006.01) |
| *G01S 17/87* | (2006.01) |

(52) U.S. Cl.
CPC .............. *G01B 11/14* (2013.01); *G01B 11/005* (2013.01); *G01B 11/26* (2013.01); *G01S 17/875* (2013.01)

(58) Field of Classification Search
None
See application file for complete search history.

(56) References Cited

U.S. PATENT DOCUMENTS

| | | | |
|---|---|---|---|
| 4,621,926 A | 11/1986 | Merry et al. | |
| 4,939,678 A | 7/1990 | Beckwith, Jr. | |
| 5,455,670 A | 10/1995 | Payne et al. | |
| 6,166,809 A | 12/2000 | Pettersen et al. | |
| 6,611,346 B2 | 8/2003 | Granger | |
| 7,358,516 B2 | 4/2008 | Hoeller et al. | |
| 2011/0157603 A1 | 6/2011 | Spruck | |
| 2012/0218563 A1* | 8/2012 | Spruck ................. | G01B 11/002 356/612 |

FOREIGN PATENT DOCUMENTS

| | | |
|---|---|---|
| DE | 102008045386 | 3/2010 |
| WO | 88/07656 | 10/1988 |

* cited by examiner

*Primary Examiner* — Kara E Geisel
*Assistant Examiner* — Amanda Merlino
(74) *Attorney, Agent, or Firm* — Sand & Sebolt

(57) ABSTRACT

A measuring unit is set up to determine a relative position and relative orientation between the measuring unit and an arrangement of at least three optical elements. The measuring unit comprises a length measuring device, which emits measuring beams at at least three locations spaced apart from one another, and at least one beam directing device set up to direct the measuring beams to optical elements of the arrangement. The beam directing device is controllable in order to guide at least one of the measuring beams to a plurality of optical elements of the arrangement in a time-sequential manner in order to carry out a plurality of length measuring operations in a time-sequential manner in such a manner that, in the plurality of length measuring operations, each measuring beam of the at least one measuring beam strikes precisely one of the optical elements. A total of six lengths are measured in this manner.

17 Claims, 4 Drawing Sheets

MEASURING UNIT, MEASURING SYSTEM AND METHOD FOR DETERMINING A RELATIVE POSITION AND RELATIVE ORIENTATION

CROSS-REFERENCE TO RELATED APPLICATIONS

This is a National Stage Entry of PCT/EP2011/062787 having an international filing date of Jul. 26, 2011; which application claims priority from German Patent Application Serial No. 10 2010 039 948.5, filed Aug. 30, 2010

BACKGROUND OF THE INVENTION

1. Technical Field

The present invention relates to a measuring unit, a measuring system and a method for determining a relative position and relative orientation. The present invention relates in particular to a measuring unit and a method for determining a relative position and relative orientation using electromagnetic radiation.

2. Background Information

The measurement of a location and orientation of an object in a three-dimensional space has various applications, for example in industrial production or in quantitative quality control, in particular in industrial production. Tactile coordinate measuring machines, for example, may be used in quantitative quality control which can attain high precisions in volumes of a few cubic meters; however, the position of a measuring probe must be determined with a corresponding accuracy. Other applications for determining the location of an object relative to a reference system include robot kinematics in industrial production or measurement, in which at least some elements of the robot kinematics have three translatory and three rotatory degrees of freedom. In such and other apparatuses it is required to determine the location of a component of the system in space. For determining the location, both the position of a predetermined point of the component relative to a fixed point and the orientation of a coordinate system defined by the component relative to a stationary reference system in the laboratory must be known. For example, for a coordinate measuring machine it is required that the location, i.e. the position and orientation of a measuring head in a space, can be determined with high accuracy. Calibration techniques may be used to this end, as described in U.S. Pat. No. 6,611,346 B2.

It is a challenge to determine the position and orientation of an object in space in an accurate manner. Techniques using electromagnetic radiation, in particular optical techniques using radiation with wavelengths in the IR, visible or UV part of the electromagnetic spectrum are attractive with regard to their accuracy and the device complexity required for determining the location.

Methods for determining the location of an object using electromagnetic beams, in particular optical beams, are described in U.S. Pat. No. 7,358,516 B2 and U.S. Pat. No. 4,621,921, for example. In U.S. Pat. No. 4,621,926, at least five interferometers are used in total to track and control the movement of an object on a non-linear path. In the method described in U.S. Pat. No. 7,358,516 B2 a beam cone is respectively emitted from one point or from plural points which simultaneously covers plural reflectors. Controllable shutters or other techniques may be used to attain unambiguousness between the point of origin of the beam cone and the reflector.

There is a continued need for devices and methods with which a position and orientation of an object relative to a reference frame may be determined using electromagnetic radiation. In particular, there is a need for such devices and methods in which problems relating to the unique allocation of elements between which a length was measured may be mitigated. There is further a need for such devices and methods which allow the location of the object to be reliably determined for a wide range of different locations of the object without requiring the location of the object to be changed for this purpose.

BRIEF SUMMARY OF THE INVENTION

According to the invention, a measuring unit, a measuring system and a method as defined in the independent claims are provided. The dependent claims define advantageous or preferred embodiments.

A measuring unit according to an aspect is configured to determine a relative position and relative orientation between the measuring unit and an arrangement of at least three optical elements. The measuring unit comprises a length measuring device configured to emit measuring beams at at least three spaced-apart locations, and at least one beam directing device configured to direct the measuring beams onto optical elements of the arrangement. The at least one beam directing device is controllable to direct at least one of the measuring beams onto plural optical elements of the arrangement in a time-sequential manner to time-sequentially perform plural length measuring operations such that in each of the plural length measuring operations each measuring beam of the at least one measuring beam impinges on only one of the optical elements. The at least three optical elements are spaced apart from each other by known distances, and the locations at which the measuring beams are emitted are spaced apart from each other by known distances. The arrangement is such that at least six lengths between the locations and the optical elements can be measured.

In this measuring unit a measuring beam may be adjusted between different optical elements using the beam directing device, wherein it is directed on respectively just one of the optical elements in different length measuring operations. A unique assignment of a measured length to a emission location—optical element pair is thereby attained for the measuring beam. This applies accordingly if plural measuring beams are adjusted between various optical elements. Here, different measuring beams may be directed onto different optical elements in a length measuring operation such that at maximum one measuring beam impinges onto each optical element of the arrangement in each length measuring operation. Alternatively, the measuring beams may also be directed such that two or more than two measuring beams simultaneously impinge onto the same optical element, wherein at least the respective optical element, advantageously the plurality of optical elements, is configured such that beams impinging from different directions are reflected onto the emission location in a unique manner.

The beam directing device allows sufficient information for determining the relative position and orientation to be collected when using three locations at which the measuring beams are emitted, due to the adjusting capabilities that are provided. The beam directing device also has the effect that no wide fan-like beams or beam cones have to be used, which increases the quality of a length measurement.

The measuring beams may be electromagnetic beams having a wavelength in the IR, visible or UV part of the electromagnetic spectrum.

In embodiments, the measuring unit may be attached to an object for which the position and orientation of is to be determined, while the arrangement of optical elements is positioned in a spatially fixed manner. In further embodiments, the measuring unit may be provided in a spatially fixed manner, while the arrangement of the optical elements is attached to the object for which the position and orientation is to be determined.

The plural length measuring operations may be performed while the relative position and orientation between the measuring unit and the reference system defined by the arrangement of optical elements remains substantially unchanged.

The three locations are advantageously arranged such that they are not all positioned on one straight line. The arrangement of the at least three optical elements is configured such that at least three optical elements are not all positioned on one straight line. Thereby, the linear independence of the measured lengths may be ensured, with each of the measured lengths respectively representing the distance between one of the emission locations and one of the optical elements.

The length measuring device and the at least one beam directing device may be configured such that each of the measuring beams has a beam cross-section in which at most one optical element is arranged. In particular, the measuring beams may have a constant beam cross-section having a small diameter or may be slightly divergent. The signal-noise-ratio may thereby be increased in the length measurement.

The measuring unit may have a collimation optic for beam forming to generate non-divergent or only slightly divergent measuring beams.

The at least one beam directing device may be configured to scan each one of a plurality of measuring beams over plural optical elements of the arrangement in a time-sequential manner to perform the plural length measuring operations. When plural measuring beams are adjusted in this manner between successive length measuring operations, the number of locations from which measuring beams are emitted and/or the overall measurement time required for determining at least six linearly independent lengths may be reduced. For example, three measuring beams may be directed onto the optical elements in one length measuring operation such that three lengths are measured in a time-parallel manner, wherein the three measuring beams may be adjusted subsequently and may be directed onto the optical elements in another length measuring operation such that three further lengths are measured in a time-parallel manner.

The length measuring device and the at least one beam directing device may be configured such that in at least one of the plural length measuring operations the plural measuring beams are emitted simultaneously and are simultaneously directed onto the optical elements of the arrangement. The overall measurement time required for determining the location and orientation may thereby be reduced.

The length measuring device and the at least one beam directing device may be configured such that to perform the plural length measuring operations three measuring beams are scanned over plural optical elements of the arrangement to respectively measure three lengths in each one of the plural length measuring operations. Thereby, a high degree of parallelism is attained in measuring the six lengths. In particular, the number of lengths which is required in total may be determined with two sequential length measuring operations, with three lengths being respectively determined in each of the two sequential length measuring operations.

Scanning the different measuring beams may be implemented in various ways. In one length measuring operation, a first measuring beam emitted from a first location may be directed onto a first optical element of the arrangement, a second measuring beam may be directed onto a second optical element of the arrangement, and a third measuring beam may be directed onto a third optical element of the arrangement. The first, second and third optical elements are pairwise different. In another length measuring operation, the first measuring beam may be directed onto an optical element of the arrangement which is different from the first optical element, the second measuring beam may be directed onto an element of the arrangement which is different from the second optical element, and the third measuring beam may be directed onto an optical element of the arrangement which is different from the third optical element. For example, in the further length measuring operation the first measuring beam may be directed onto the second optical element, the second measuring beam may be directed onto the third optical element, and the third measuring beam may be directed onto the first optical element.

A control device may be provided for controlling the at least one beam directing device, the control device controlling the at least one beam directing device such that the at least one measuring beam is directed onto different optical elements in different length measuring operations. The control device may be configured such that it controls the at least one beam directing device in dependence on an estimate of the relative position and relative orientation between the measuring unit and the arrangement of optical elements. The estimate may for example be provided by a measuring system that operates with lower precision or by the controller of a machine or assembly for which the location relative to a reference system is to be determined. If the position and orientation of a component of a robot is to be determined using the measuring unit, for example, the control device may have an interface with the robot control to receive information on a target location. In dependence thereon, the control device may control the at least one beam directing device such that the measuring beam is scanned over optical elements in a targeted manner. Scanning a wide range for identifying the optical elements may thereby be omitted and the time required for determining the relative position and orientation may be reduced. For this purpose, the relation between a coordinate system of the robot relative to a coordinate system of the measuring unit may be determined in a first step, using for example a measuring system which operates with lower precision or information on a target location of the coordinate system of the robot relative to the coordinate system of the measuring unit. This relation is defined by three translatory and three rotatory degrees of freedom.

The control device may be configured to control the at least one beam directing device in dependence on the estimate such that the at least one measuring beam is scanned from an optical element onto a further optical element in a targeted manner. The control device may be configured such that at least one beam directing device is adjusted between length measuring operations such that the measuring beam impinges at least onto a surrounding area of the further optical element. The measurement time required for determining the six lengths may thereby be reduced.

The control device may be configured to select the optical elements onto which the measuring beams are directed from the entirety of optical elements. The control device may perform the selection in dependence on the estimate for the relative position and relative orientation. The control device may then control the at least one beam directing device accordingly such that the measuring beams are directed onto the selected optical elements.

The selection of optical elements may be implemented in accordance with different criteria. In one implementation, the control device may select the optical elements onto which the measuring beams are to be directed such that optical shadowing effects are prevented. The control device may make this selection such that for none of the selected optical elements there is a shadowing of the measuring beam which is to impinge onto this optical element, the selection being made in dependence on the geometry of a machine which has the component for which the location is to be determined and in dependence on the estimate of the relative position and relative orientation.

Alternatively or additionally, the control device may select the optical elements onto which the measuring beams are to be directed such that the relative location and orientation has a small errors in the subsequent computational evaluation of the lengths. For this purpose, the control device may select the optical elements in dependence on the estimate of the relative position and relative orientation such that the vectors between the emission locations and the associated optical elements for which the lengths are to be measured are located in a solid angle range which is greater than a threshold. I.e., the control device may select the optical elements such that the directions of these vectors are not too similar to each other. The control device may select the optical elements onto which measuring beams emitted from the various locations are to be directed such that at least a pair of the vectors between emission locations and optical elements encloses an angle which is different from $\pi/2$ by less than a threshold.

Alternatively or additionally, the control device may select the optical elements onto which the measuring beams are to be directed such that a good signal-noise-ratio is attained. For this purpose, the control device may select from among plural available optical elements those ones which have a smaller distance from the associated location at which the respective measuring beam is emitted, the selection being made in dependence on the estimate of the relative position and relative orientation.

The beam directing device may have one or plural microelectromechanical devices. In particular, the beam directing device may have one or plural MEMS mirrors. A compact construction of the measuring unit may thereby be realized.

The beam directing device may also have an angle expansion optic. This makes it possible that the measuring beams can be adjusted sufficiently far such that they can be selectively directed onto different optical elements, in spite of the angle limitations which result from use of a MEMS mirror.

At least three beam directing devices may be provided, each of which is assigned to one of the locations at which a measuring beam is emitted. Thereby, the measuring beams may be scanned independently from each other over different optical elements while the measuring unit may be formed to be compact.

The angle expansion optic may be configured such that a light propagation time through the angle expansion optic is substantially independent of angle. Alternatively or additionally, an evaluation device for determining the relative location and relative orientation from the at least six lengths may computationally compensate angle-dependent differences in propagation time through the angle expansion optic. The evaluation device may receive information on the deflection angle from the control device to computationally compensate the differences in propagation time. The computational compensation may be performed using calibration techniques.

If the optical elements are configured as reflecting elements, the measuring unit may further comprise detectors for detecting the measuring beams after propagation through the path from the location to one of the optical elements and back to the location. The detectors may be provided in an area surrounding the locations at which the measuring beams are emitted. The detectors may be photodetectors.

Various techniques may be used for the actual path length measurement, which are known for one-dimensional path length measurements. In one implementation, the measuring beams may comprise a series of pulses having a repetition rate. The evaluation device may evaluate a sinusoidal component of the signals captured by the detectors. The sinusoidal component may have a frequency which corresponds to the repetition rate. The sinusoidal component may have a frequency which corresponds to an integer multiple of the repetition rate. The evaluation device may determine the traversed path length from a phase shift of the sinusoidal component relative to a reference wave having the same frequency. An optical frequency comb generator may be used to generate the measuring beams. Other techniques for path length measurement may also be used.

The measuring unit may have a carrier on which the locations for emitting the measuring beams are defined. The carrier may comprise a material having a low thermal expansion coefficient, such as Zerodur. Alternatively or additionally, temperature sensors may be provided to compensate a thermal change in distance between the locations at which the measuring beams are emitted when determining the position and orientation from the six measured lengths.

A measuring system according to an aspect is configured to determine a relative position and relative orientation between a measuring unit and an arrangement of at least three optical elements. The at least three optical elements are spaced from each other by known distances. The measuring unit is configured as a measuring unit according to an aspect or embodiment.

In the measuring system the measuring unit may be attached to a movable object for which the position and orientation is to be determined. The arrangement of optical elements may then be provided in a spatially fixed manner and may define a reference system.

In the measuring system, it is also possible that the arrangement of the optical elements is provided on the movable object for which the position and orientation is to be determined. The measuring unit may then be provided in a spatially fixed manner and may define a reference system.

The optical elements may be formed as passive elements. In particular, each one of the optical elements of the arrangement may be configured as a retroreflector. In this case, the measuring unit may also comprise detectors for detecting the measuring beams after reflection on the optical elements.

The optical elements may also be configured as detectors. In this case, the path from the measuring unit to the optical element is traversed only once.

According to another aspect, a method for determining a relative position and relative orientation between a measuring unit and an arrangement of at least three optical elements is provided. The at least three optical elements are spaced from each other by known distances. In the method, measuring beams are emitted at at least three spaced-apart locations of the measuring unit, with the three locations being spaced apart from each other by known distances. The measuring beams are directed onto optical elements of the arrangement. In this process, at least one of the measuring beams is directed onto plural optical elements of the arrangement in a time-sequential manner to time-sequentially perform plural length measuring operations, wherein in the plural length measuring operations each measuring beam of the at least one measuring beam respectively impinges on only one of the optical elements. In total, at least six lengths are measured.

In the method, a unique assignment of a measured length to a pair of emission location and optical element is attained for the measuring beam. With a measuring beam being directed onto different optical elements in different length measuring operations, sufficient information for determining the relative position and orientation may be collected by using three locations at which the measuring beams are emitted due to the adjustment capabilities. The beam directing device also has the effect that no wide fan-shaped beams or beam cones have to be used, such that signal-noise-ratios in detecting optical signals may be increased.

Each one of the measuring beams may be emitted and directed such that it impinges on respectively at most one optical element in the length measuring operations.

Plural measuring beams may be scanned over plural optical elements of the arrangement in a time-sequential manner to perform the plural length measuring operations in the method.

In the method, the plural measuring beams may be emitted simultaneously in at least one of the length measuring operations.

In the method, three measuring beams may be scanned over plural optical elements to perform the plural length measuring operations to respectively measure three lengths in a simultaneous manner. In a first length measuring operation, three measuring beams may simultaneously be directed onto three optical elements, and in a second length measuring operation the three measuring beams may simultaneously be directed onto the three optical elements, such that in the second length measuring operation each one of the measuring beams impinges onto another optical element than in the first length measuring operation.

In the method, the optical elements onto which the measuring beams are directed may be selected in dependence on an estimate of the relative position and orientation between the measuring unit and the arrangement of optical elements.

The measuring units, measuring systems and methods according to various embodiments of the invention may generally be used for determining the position and orientation of an object relative to a reference system. Measurement applications in quantitative quality control, in particular in industrial production, are an exemplary field of use. However, the embodiments of the invention are not limited to these applications.

BRIEF DESCRIPTION OF THE SEVERAL VIEWS OF THE DRAWINGS

In the following, the invention will be explained in more detail by means of embodiments with reference to the accompanying drawing.

DETAILED DESCRIPTION OF THE INVENTION

Embodiments of the invention will be explained in more detail in the following. The features of the various embodiments may be combined with each other unless this is explicitly excluded in the following description. While certain embodiments are described with respect to specific applications, for example in the context of an industrial system, the subject invention is not limited to these applications.

Figure 1:
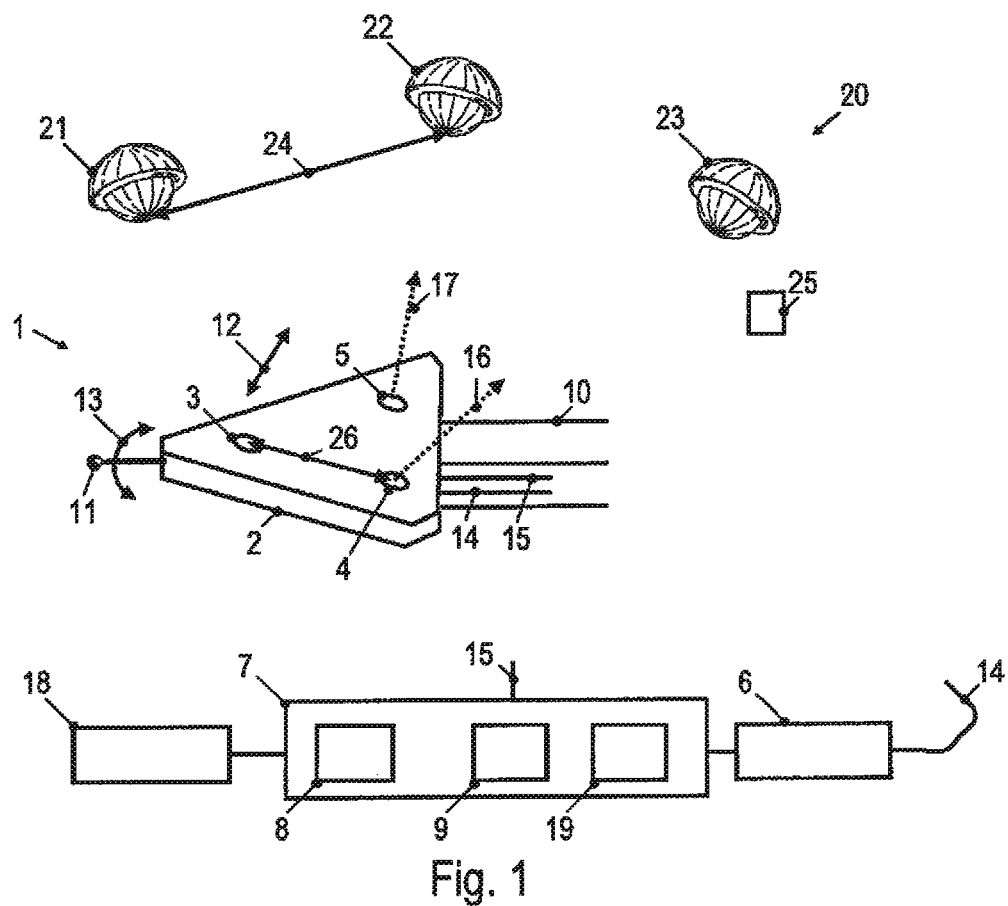
FIG. 1 is a schematic representation of a measuring system according to an embodiment.

FIG. 1 is a schematic representation of a measuring system according to an embodiment. The measuring system is configured to determine a relative position and relative orientation between a measuring unit 1 having a measuring head 2 and an arrangement 20 of optical elements. The measuring unit 1 is configured such that it can determine six linearly independent lengths between pre-determined locations on the measuring head 2 and optical elements of the arrangement 20.

Three transmitter-receiver-units 3-5 are provided on the measuring head 2 of the measuring unit 1. Each one of the transmitter-receiver-units 3-5 comprises an exit opening for emitting a measuring beam. The three transmitter-receiver-units 3-5 are arranged such that the distances between the transmitter-receiver-units 3-5 are known with a high precision. A distance between the first transmitter-receiver-unit 3 and the second transmitter-receiver-unit 4 is schematically shown at 26. The distances between the transmitter-receiver-units 3-5 do not all have to be equal. The transmitter-receiver-units 3-5 are provided on the measuring head 2 such that they do not all lie on one straight line. The transmitter-receiver-units 3-5 may be provided at the corners of a triangle, for example of an equilateral triangle. The transmitter-receiver-units 3-5 which are not arranged on one straight line define a plane and may be used for defining a coordinate system of the measuring head 2. For example, the x-axis of the coordinate system of the measuring head may be defined as axis from the beam exit position of the first transmitter-receiver-unit 3 to the beam exit position of the first transmitter-receiver unit 4. The y-axis of the coordinate system of the measuring head may be defined as an axis in the plane defined by the three transmitter-receiver-units 3-5 which is orthogonal to the vector from the beam exit position of the first transmitter-receiver unit 3 to the beam exit position of the second transmitter-receiver-unit 4. The z-axis of the coordinate system of the measuring head may be defined as the axis which is perpendicular to the plane defined by the three transmitter-receiver-units 3-5 such that a right-handed coordinate system is formed. For example, the z-axis may be defined as axis which is parallel to the cross-product of the vector from the beam exit position of the first transmitter-receiver-unit 3 to the beam exit position of the second transmitter-receiver-unit 4 and the vector from the beam exit position of the first transmitter-receiver-unit 3 to the beam exit position of the third transmitter-receiver-unit 5. The origin of the coordinate system may for example be set on the beam exit position of the first transmitter-receiver-unit 3. Other definitions of the coordinate system of the measuring head are also possible.

In the measuring system of the embodiment of FIG. 1, the arrangement 20 of optical elements is provided so as to be stationary. The arrangement comprises at least three optical elements 21-23. The at least three optical elements 21-23 are arranged such that they do not all lie on one straight line. The optical elements 21-23 may, for example, be arranged at corners of a triangle, for example of an equilateral triangle.

The three optical elements 21-23 define a reference system. Coordinate axes of the reference system may for example be defined analogously to the coordinate axes of the measuring head coordinate system, depending on the direction vectors between specific points of the optical elements 21-23. The reference system may also be defined as lab system in which the elements 21-23 are arranged in a stationary manner. Distances 24 between characteristic points of the optical elements 21-23 or the locations of the elements 21-23 in the lab system, respectively, are known and may be used for determining the relative location and orientation between the measuring unit 1 with the measuring head 2 and the arrangement 20 of optical elements. The optical elements may be configured as passive elements, in particular as reflective elements. In particular, each one of the optical elements may be a retroreflector, for example a retroreflector sphere or a triple prism. While an arrangement having three optical elements is provided in FIG. 1 for illustration, more optical elements may also be provided.

Generally, the operation of a measuring system is such that six linearly independent lengths between transmitter-receiver-units and optical elements are measured in total. For this purpose, the measuring unit uses measuring beams which are emitted by the transmitter-receiver-units at the locations 3-5. Two measuring beams 16, 17 are shown for illustration. The transmitter-receiver-units 3-5 of the measuring unit 1 are configured such that a measuring beam which is not divergent or only slightly divergent is emitted. The transmitter-receiver-units 3-5 may in particular emit the measuring beams such that each of the measuring beams impinges on at most one of the optical elements. The opening angle of the measuring beams may be selected such that at most one optical element 21-23 is arranged in the beam cross-section upon incidence onto the arrangement 20 of optical elements 21-23.

As will be described in more detail, the transmitter-receiver-units 3-5 comprise a device for directing the measuring beams. This device is configured such that the measuring beams 16, 17 can be directed onto respectively one of the optical elements 21-23 in a targeted manner. In particular, at least one of the measuring beams may be directed such that it impinges onto different optical elements 21-23 of the arrangement in a time-sequential manner. By scanning one or plural measuring beams, a sufficient number of linearly independent lengths can be measured. In one implementation, each one of the transmitter-receiver-units 3-5 is configured such that the measuring beam emitted therefrom may be scanned over different optical elements 21-23 of the arrangement 20 in a targeted manner.

Use of the plural transmitter-receiver-units 3-5 allows plural lengths to be measured simultaneously. Thus, a first set of three lengths may be measured in a first length measuring operation by directing the beams emitted by the three transmitter-receiver-units 3-5 onto optical elements of the arrangement 20. In a subsequent second length measuring operation, a second set of three lengths may simultaneously be measured, with the beams emitted by the three transmitter-receiver-units 3-5 being again directed onto optical elements of the arrangement 20. The transmitter-receiver-units direct the measuring beams emitted by them such that in the second length measuring operation at least one of the measuring beams, and advantageously all measuring beams, is/are respectively directed onto another optical element of the arrangement 20 than in the first length measuring operation. The transmitter-receiver-units 3-5 may be controlled in each one of the length measuring operations such that at most one measuring beam is directed onto each optical element of the arrangement 20 to reduce errors.

The position and orientation of the measuring head 2 of the measuring unit 1 relative to the arrangement 20 of optical elements is determined from the six measured lengths. The relative position may for example be defined by the three Cartesian coordinates of the origin of the measuring head coordinate system in the reference system in which the arrangement 20 is provided. The relative orientation may be defined by three Euler angles which define a rotation of the measuring head coordinate system relative to the reference system.

The measuring head 2 may be attached to a component 10 of a machine or a system, for example. Use of the measuring head on a coordinate measuring machine is schematically illustrated. The coordinate measuring machine may comprise a mechanical or optical probe 11 with which a surface may be sampled. The position and orientation of the measuring head 2 and thus of the probe 11 may be adjusted by a translatory movement 12 or a rotatory movement 13 relative to the reference system of the arrangement 20. By performing length measuring operations with which six linearly independent lengths are measured while the location of the measuring head 2 in the reference system remains substantially unchanged, the relative position and relative orientation may be determined.

A light source 6 is provided in the measuring system 1. The light source 6 may generate optical signals having a wavelength in the IR, visible or UV part of the electromagnetic spectrum. The signals generated by the light source 6 are provided to the transmitter-receiver-units 3-5 which emit the optical signals in a manner which will be described in more detail below. The light source 6 may be integrated into the measuring head 2. When using a light source having a high output power, in particular a laser, the light source is advantageously provided separately from the measuring head 2. An optical fiber 14 or plural optical fibers 14 may be provided to guide the optical signals generated by the light source 6 to the measuring head 2.

An electronic computing device 7 is provided in the measuring system 1. The electronic computing device 7 has a control device 8 which controls the transmitter-receiver-units 3-5 such that the emitted measuring beams are scanned over plural optical elements of the arrangement 20 in a time-sequential manner. The control of the transmitter-receiver-units 3-5 may be performed in dependence on an estimate of the relative position and orientation of the measuring head 2 to the arrangement 20 of optical elements 21-23. If the measuring head 2 is provided on the component 10 of a machine or system, for example on a robot, such an estimate may be determined from a target value of the position of the component 10. The target value may be provided by a controller 18 of the machine or system.

To control the transmitter-receiver-units 3-5 such that at least one of the emitted measuring beams is specifically adjusted in its direction such that it is initially directed onto one of the optical elements and, in another length measuring operation, is directed onto another one of the optical elements in a targeted manner, the control device 8 may also use information on the positions of the optical elements 21-23 of the arrangement 20 stored in a memory 19. If thermal effects are non-negligible, the control device 8 may at least partly compensate changes in positions of the optical elements 21-23 of the arrangement 20 which are induced by thermal expansion or contraction for a highly accurate determination of the relative position and orientation. For this purpose, the control device 8 may evaluate a temperature signal provided by a temperature sensor 25 and information on a thermal expansion coefficient of a carrier of the optical elements 21-23 to determine the positions of the optical elements of the arrangement 20 which are valid for the measured temperature. The temperature-corrected positions may be used for generating control signals for the transmitter-receiver-units 3-5. The control signals may be provided to the transmitter-receiver-units 3-5 via suitable communication paths, for example via lines 15.

The computing device 7 also has an evaluation device 9 which determines the position and orientation of the measuring head 2 relative to a reference system in dependence on the six linearly independent lengths which were measured between transmitter-receiver-units 3-5 and optical elements of the arrangement 20. The evaluation device 9 receives signals from the transmitter-receiver-units 3-5 from which the six measured lengths can be determined. In the general case, a total of six values are determined by the evaluation device which define the relative position (three coordinates) and relative orientation (three Euler angles) for determining the relative position and orientation. Depending on the application it may be sufficient to determine a smaller number of values to define the relative position and relative orientation. The evaluation is performed using the known positions of the optical elements of the arrangement 20 in a reference system and the relative locations of the exit locations of the measuring beams of the transmitter-receiver-units 3-5.

The evaluation device 9 may employ various computational techniques to determine the relative position and orientation between the measuring head 2 and the reference system from the six lengths. For example, the techniques used in U.S. Pat. No. 7,358,516 B2 may be used. Alternatively or additionally, an optimization technique may be used, such as an iterative optimization technique in which the parameter space spanned by the different relative positions and different relative orientations is sampled to determine the values for the relative position and relative orientation.

The evaluation device 9 may use information on the positions of the optical elements of the arrangement 20 stored in a memory 19 for the evaluation. The evaluation by the evaluation device 9 may further be performed using an estimate for the relative position and orientation provided by the controller 18, for example. If thermal effects are non-negligible, changes in positions of the optical elements of the arrangement 20 caused by thermal expansion or contraction may be compensated at least in part by the evaluation device 9 for determining the relative position and orientation with a high accuracy, as described for the operation of the control device 8. Alternatively or additionally, the evaluation device may also compensate optical path length differences within the transmitter-receiver-units 3-5 which exist for different deflection angles of the measuring beams.

The evaluation device 9 may also perform functions with which the six lengths are determined from signals provided by the transmitter-receiver-units 3-5. The evaluation device 9 may have different configurations depending on the technique which is used for the optical path length measurement. In one implementation, the light source 6 generates optical pulses having a repetition rate f0. The light source 6 may be configured such that it generates an optical frequency comb, for example. The pulses may be square pulses of intensity. The transmitter-receiver-units 3-5 may respectively detect the intensity of the measuring beams as a function of time after traversal of the path from the transmitter-receiver-units 3-5 to one of the optical elements and back to the respective transmitter-receiver-unit 3-5. The optical path length may be determined in dependence on the detected intensity as a function of time after traversal of the path between the transmitter-receiver-unit and optical element. In one implementation, the detected intensity may be subject to filtering to determine the optical path length such that a sinusoidal component of the detected intensity is determined. The frequency of this component may be equal to the repetition rate f0. Advantageously, a sinusoidal component of the detected intensity may be determined which has a frequency that corresponds to an integer multiple of the repetition rate f0. Depending on a phase difference between the sinusoidal component of the detected intensity and a reference signal which oscillates with the same frequency, the propagation time and thus the optical path length of the measuring beam may be determined. The reference signal may be determined by filtering the sequence of pulses 14 provided by the light source 6 to the transmitter-receiver-units 3-5. Various additional features may be used for a stable and accurate path length measurement. Examples for such features comprise down-conversion of the sinusoidal component of the detected intensity. Examples for such features which may be used in the measuring system of the subject application are described in more detail in DE 10 2008 045 386.2.

The representation of the computing device 7 in FIG. 1 is only schematic. For example, the control device 8 and the evaluation device 9 may jointly use components of the electronic computing device 7. The computing device 7 may comprise a processor which performs both operations for controlling the transmitter-receiver-units and operations for determining the relative position and relative orientation from the measured lengths. Electric or electronic components which perform the control functions and/or electric or electronic components which perform evaluation functions may also be integrated into the measuring head 2. For example, detectors and filters may be provided on the measuring head to convert the optical signal into an electric signal, e.g. a high-frequency electric signal. Further, electric mixers may be provided to convert the high-frequency signal into a signal having a lower frequency which is then guided to the evaluation unit 9 over lines 15.

A larger number of optical elements may be provided in the measuring system. An arrangement of more than three optical elements may be provided on one or several partition walls of an industrial system, for example. The selection of the optical elements onto which one of the measuring beams is directed for a measurement of a length may then be performed automatically by the control device 8 in dependence on predetermined criteria. The control device 8 may select the optical elements such that shadowing is prevented. The control device 8 may select the optical elements such that a high precision of the determined relative position and orientation is guaranteed. For this purpose, the selection may be performed such that the solid angle which is spanned by the vectors between the beam exit positions of the transmitter-receiver-units 3-5 and the optical elements 21-23 onto which the beams are respectively aimed is greater than a threshold. The control device 8 may select the optical elements such that a signal-noise-ratio is increased. For this purpose, the selection may be performed such that close-by optical elements are preferred over more distant ones. The intelligent selection may be performed in dependence on an estimate of the relative position and relative orientation.

The determination of the typically six values which specify the relative position and relative orientation is performed not only in dependence on the measured lengths, but also in dependence on the known positions of the transmitter-receiver-units 3-5 on the measuring head 2 relative to each other and in dependence on the known positions of the optical elements 21-23 relative to each other. In order to attain stability against temperature variations, the units 3-5 and/or the optical elements 21-23 may respectively be provided on a carrier having a thermal expansion coefficient of less than $3\times10^{-6}$ μm/(m×K), in particular of less than $1\times10^{-6}$ μm/(m×K), in particular of less than $0.1\times10^{-6}$ μm/(m×K). Alternatively or additionally, there may be provided a temperature sensor for measuring a temperature on the carrier of the units 3-5 and/or on the carrier of the optical elements 21-23, with distance changes caused by temperature variations being computationally compensated. Frequently, a characteristic distance between the transmitter-receiver-units 3-5 will be significantly different from a characteristic distance between the optical elements 21-23. For a measuring system in which the measuring head with the transmitter-receiver-units 3-5 is movable and the optical elements 21-23 of the arrangement 20 are stationary, the transmitter-receiver-units 3-5 may be provided on a carrier having a small thermal expansion coefficient, for example a carrier made from Zerodur, and temperature-induced distance variations between the optical elements 21-23 may be compensated computationally.

Figure 2:
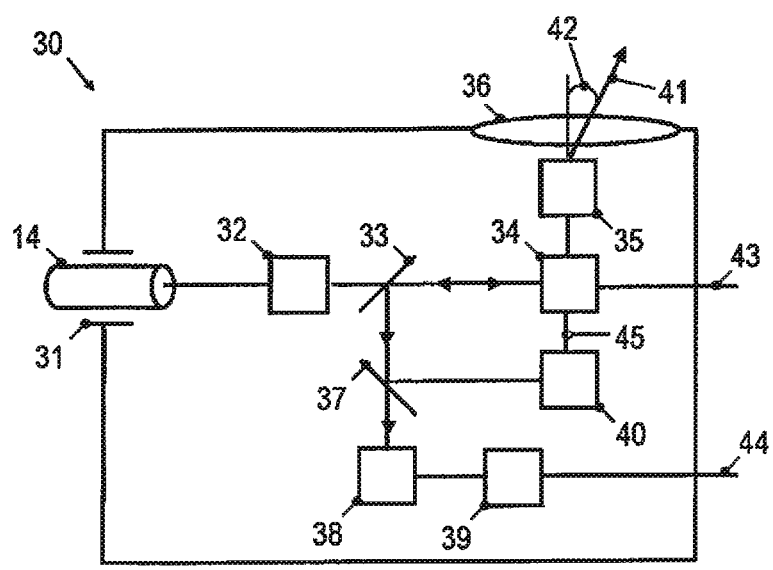
FIG. 2 is a schematic representation of a transmitter-receiver-unit of a measuring unit according to an embodiment.

FIG. 2 is a schematic representation of a transmitter-receiver-unit 30. Plural such transmitter-receiver-units may be provided on the measuring unit 1 as transmitter-receiver-units 3-5. In particular, the measuring unit may comprise three or more than three such units. The transmitter-receiver-unit 30 is configured as a module such that the transmitter-receiver-unit 30 may be produced and may subsequently be mounted on a measuring head.

The transmitter-receiver-unit 30 comprises a receptacle 31 in which an end of an optical fiber 41 may be inserted. Light emitted from the end of the optical fiber 14 is guided over a collimation optic 32 and a beam splitter 33 to a controllable deflection device 34. The collimation optic 32 is configured such that the measuring beam emitted by the transmitter-receiver-unit 30 has an opening angle such that at most one optical element is arranged in the measuring beam in a length measuring operation. The controllable deflection device 34 may be configured as a micro-electromechanical device, in particular as a MEMS mirror.

The deflection device 34 may be configured such that it has two degrees of freedom such that it can deflect the measuring beam not only along a line, but along two independent directions. For this purpose, a MEMS mirror may be supported such that it can be tilted about two different axes. The suspension may be such that both tilt axes have an intersection point to keep propagation time differences resulting from the tilting at the MEMS mirror small. Alternatively, a pair of MEMS mirrors may be provided. The deflection device 34 receives a control signal 43 over an electrical interface of the unit 30. The position of the deflection device 34 is adjusted in dependence on the control signal 43 such that the measuring beam is directed onto one of the optical elements of the arrangement. The control signal 43 may be changed between a first and a second length measuring operation such that the measuring beam is adjusted in a targeted manner from a direction in which it is directed onto a first optical element to another direction in which it is directed onto a second optical element different from the first one.

The measuring beam propagates from the controllable deflection device 34 over an angle expansion optic 35 to an exit opening 36 of the device 30. With the angle expansion optic 35 potential limitations of the adjustment range of the deflection device 34 may be compensated such that the measuring beam may be adjusted over a larger angular range. The measuring beam 41 exits at the exit opening 36 in a direction which is controlled by the deflection device 34. As mentioned, the deflection device 34 may be configured such that the measuring beam 41 may not only be adjusted along a line but in two independent directions. In other words, not only the azimuthal angle 42 shown in FIG. 2 relative to the center axis of the angle expansion optic may be changed, but the polar angle may also be changed. Thereby, a reliable scanning over various optical elements of the arrangement can be guaranteed without requiring a readjustment of the position of the measuring head on which the device 30 is mounted in use.

A measuring beam retro-reflected on the optical element is guided to a detector 38 via the angle expansion optic 35, the controllable deflection device 34 and the beam splitter 33. The detector 38 may be a photodetector and may detect the intensity of the reflected measuring beam as function of time. Signal processing components 39 for processing further the output signal of the sensor 38 may be provided in the unit 30. The signal processing components 39 may comprise an amplifier and/or a filter and/or an electronic mixer, for example. For example, a band pass filter may be provided which generates an oscillating component, in particular a sinusoidal component, of the output signal of the photodetector 38 at a first frequency. A mixer may be provided to which the component oscillating with the first frequency is supplied and which generates a component oscillating with a second frequency by down-conversion, having a frequency which is smaller than the first frequency. Propagation times and thus optical path lengths may thereby be determined with high accuracy from phase shifts of the oscillating components. If a sequence of pulses having a repetition rate is used for length measurement, the signal processing components may comprise a band pass filter having a pass band which comprises the repetition rate or a multiple of the repetition rate and having a bandwidth which is smaller than the repetition rate. After optional further processing by the signal processing components 39 an output signal of the photodetector 38 may be output as signal 44 over an interface of the unit 30.

The unit 30 may optionally comprise a device with which the position of the controllable deflection device 34 is influenced in a feedback control loop. For this purpose, part of the reflected measuring beam may be directed onto a further detector 40 over a beam splitter 37, for example. The detector 40 may be formed by one or plural photodetectors, by a four-quadrant-diode or by another photoelectric component. The detector 40 may be configured to determine whether the measuring beam was reflected at a central portion or at a peripheral portion of a retroreflector. For this purpose, the detected intensity and/or a detected position deviation at the detector 40 may be evaluated. In dependence thereon, the controllable deflection device 34 may be controlled by a control signal 45 such that the intensity detected by the detector 40 is increased and/or a detected position deviation of the reflected measuring beam is reduced. The closed-loop control of the deflection device 34 may be used for different purposes. For example, the position of the deflection device 34 may be controlled in a length measurement operation such that the measuring beam impinges onto a central portion of a reflecting optical element and/or that a detected intensity of the reflected measuring beam is maximized. Alternative or additionally, during movement of the measuring head on which the device 30 is attached in use, the position of the deflection device 34 may be controlled such that the measuring beam 41 remains directed onto one of the optical elements also during the movement. This ensures that the measuring beam is already directed onto one of the optical elements when the relative position and orientation is determined again.

Other implementations of the unit 30 are possible. The photodetector 38 and the associated signal processing components 39 may be omitted if the unit is configured as transmitter unit only. In this case, the optical elements may be configured as photodetectors, for example. Alternatively, for each transmitter unit a photodetector may be provided separately from the unit 30 at a measuring head.

Figure 6:
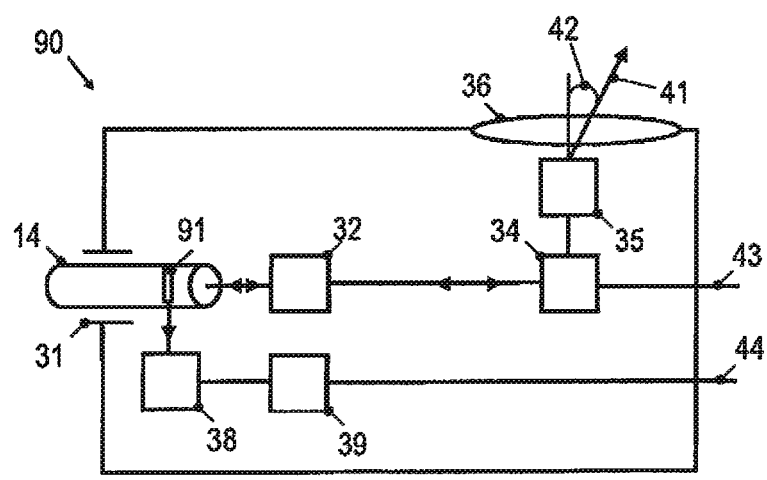
FIG. 6 is a schematic representation of a transmitter-receiver-unit of a measuring unit according to another embodiment.

FIG. 6 is a schematic representation of a transmitter-receiver-unit 90. Plural such transmitter-receiver-units may be provided on the measuring unit 1 as transmitter-receiver-units 3-5. In particular, the measuring unit may comprise three such units or more than three such units. The transmitter-receiver-unit 90 is configured as a module such that the transmitter-receiver-unit 90 may be manufactured and may subsequently be mounted on a measuring head. Components or elements which correspond, in terms of function or construction, to components or elements of the unit 30 of FIG. 2 are designated with the same reference numerals.

In the transmitter-receiver-unit 90 a measuring beam supplied via an optical fiber 14 is directed onto an optical element in a controlled manner. The return measuring beam is guided back into the fiber 14 via the collimation optic 32. The fiber 14 is provided with a fiber-optical circulator 91 or another coupler. Thereby, the returning measuring beam may be coupled into the fiber 14 to be guided to a detector 38 via the circulator 91 or via another coupler. For a fiber-optical coupling of the detector, as shown for the unit 90, the fiber may function as an aperture.

Signal processing components 39 for further processing of the output signal of the sensor 38 may be provided in the unit 90. The signal processing components 39 may be configured as described with reference to FIG. 2.

The unit 90 may optionally comprise a device with which the position of the controllable deflection device 34 is influenced in a feedback control loop as described with reference to FIG. 2.

In still other embodiments, the detector may be formed spatially separate from the measuring unit. The detector may be provided in the evaluation device, for example. Electrical components for evaluating the returning measuring beams may also be provided separately from the measuring head. These signal processing components may for example also be integrated into the evaluation device. For implementations having a detector separate from the measuring head, the measuring beams may also still be detected at the measuring unit and may, at the measuring unit, be coupled into an optical fiber which guides the returning measuring beam to the detector. A circulator or another element for separating optical signals to be emitted and received optical signals may be provided in the optical fiber, with the received signals being guided to the detector.

Figure 3:
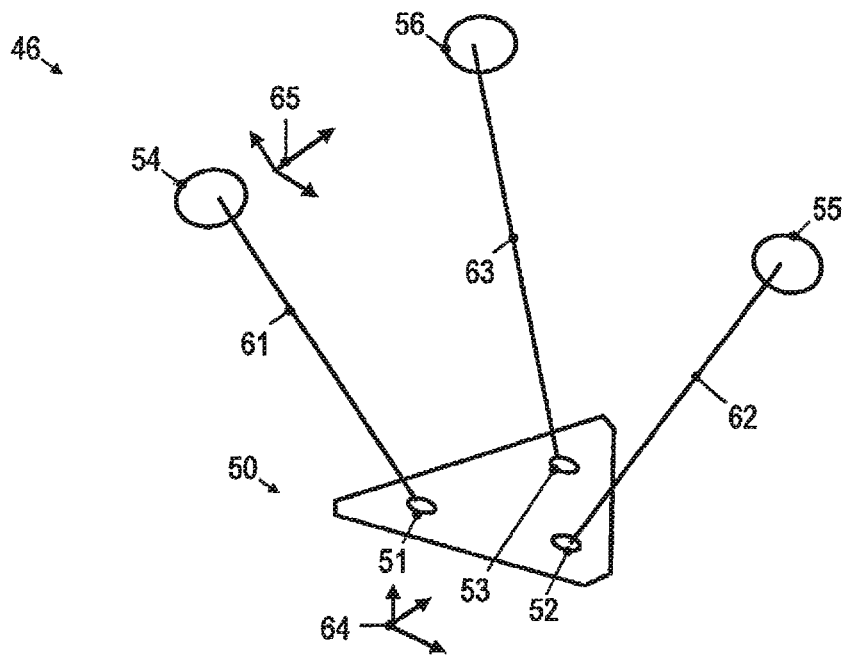
FIG. 3 shows a schematic representation of a measuring system according to an embodiment in two length measuring operations.
Figure 3:
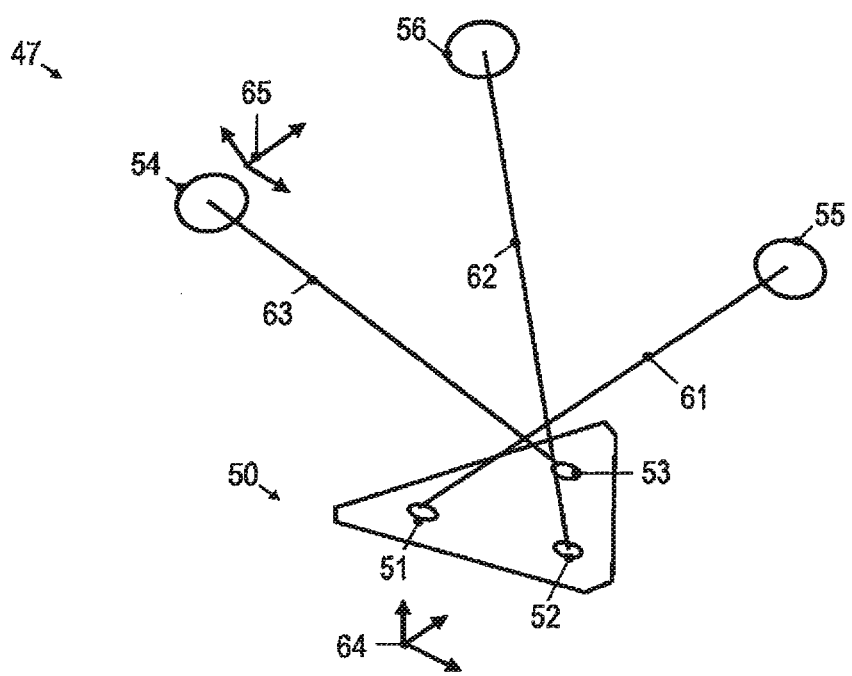
Figure 4:
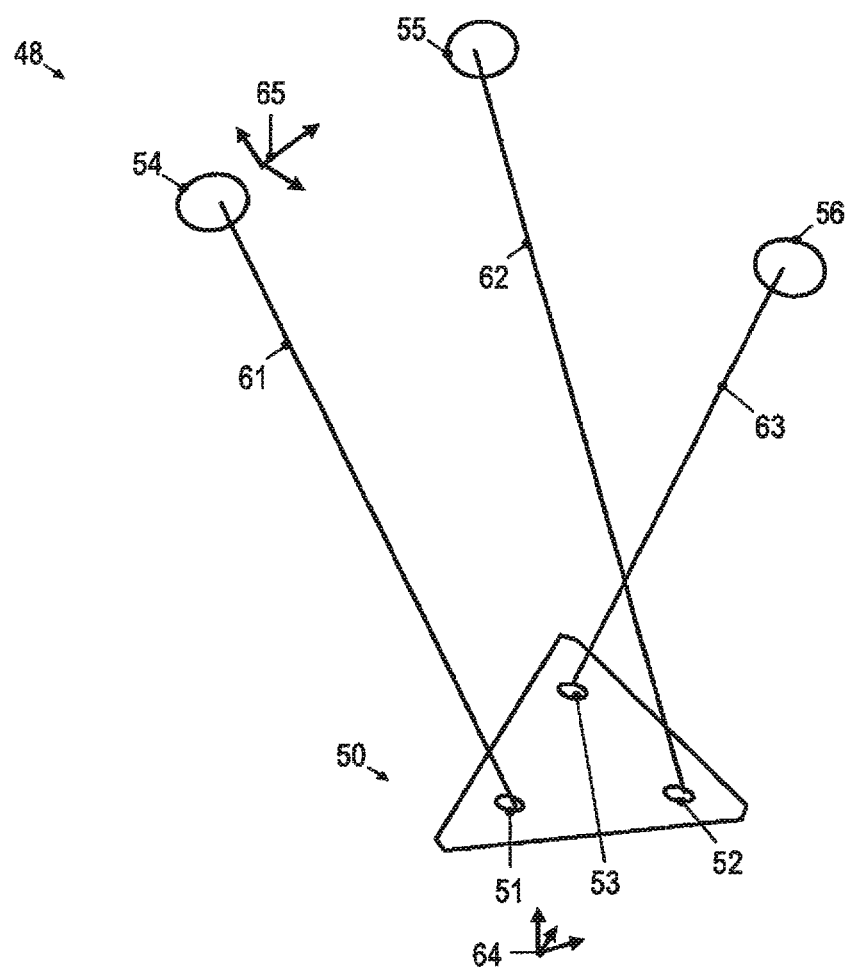
FIG. 4 shows a schematic representation of the measuring system of FIG. 3 in another length measuring operation.

With reference to FIGS. 3 and 4; the determination of the relative position and orientation between the measuring unit and a reference system defined by an arrangement of optical elements using a measuring unit according to an embodiment will be described in more detail. The measuring unit and optical elements may be configured as described with reference to FIGS. 1 and 2. In further embodiments, the measuring unit may comprise a plurality of transmitter units for emitting measuring beams which are arranged spaced from each other and in known distances from each other. The optical elements of the arrangement may respectively be configured as photodetectors such that the path between the transmitter unit and the optical element is respectively traversed only once.

A measuring unit 50 is configured such that three measuring beams 61-63 are emitted at three different locations 51-53. The three measuring beams 61-63 are directed by the measuring unit onto optical elements 54-56 of an arrangement of optical elements in a targeted manner. The three locations 51-53 are arranged in known distances such that they do not all lie on one straight line. The locations 51-53 of the measuring unit 50 define a coordinate system 64 of the measuring unit 50. Optical elements 54-56 of the arrangement of optical elements are arranged in known distances such that they do not all lie on one straight line. The optical elements 54-56 define a coordinate system 65.

FIG. 3 schematically shows the measurement of six lengths in two length measuring operations which are performed in a time-sequential manner. The configuration of the measuring beams in a first length measuring operation is shown at 46. The configuration of the measuring beams in a second length measuring operation is shown at 47.

In the first length measuring operation, the first measuring beam 61 emitted from the first location 51 is directed onto the first optical element 54. The second measuring beam 62 emitted from the second location 52 is directed onto the second optical element 55. The third measuring beam 63 emitted from the third location 53 is directed onto the third optical element 56. In this manner, three linearly independent lengths may be measured from which the distance between the first location 51 and the first optical element 54, the distance between the second location 52 and the second optical element 55 and the distance between the third location 53 and the third optical element 56 may be determined. These lengths may be measured simultaneously in time in the first length measuring operation.

In the second length measuring operation, all measuring beams 61-63 are directed such that they respectively impinge onto an optical element which is different from the optical element onto which the respective measuring beam was directed in the first length measuring operation. The change in the configuration of the beam directing device which has the effect that in the second length measuring operation the measuring beams 61-63 are respectively directed onto other optical elements than in the first length measuring operation may be made in dependence on the relative position and orientation of the measuring unit 50 relative to the arrangement of optical elements 54-56.

In the second length measuring operation the first measuring beam 61 emitted from the first location 51 is directed onto the second optical element 55. The second measuring beam 62 emitted from the second location 52 is directed onto the third optical element 56. The third measuring beam 63 emitted from the third location 53 is directed onto the first optical element 54. In this manner, three further linearly independent lengths may be measured from which the distance between the first location 51 and the second optical element 55, the distance between the second location 52 and the third optical element 56 and the distance between the third location 52 and the first optical element 54 may be determined. These further lengths may be measured simultaneously in time in the second length measuring operation.

The relative position and orientation between the measuring unit and the arrangement of optical elements may be determined by multilateration from the three lengths measured in the first length measuring operation and the three further lengths measured in the second length measuring operation.

FIG. 4 illustrates the measuring system of FIG. 3 after the measuring unit was moved in a translatory or rotational manner in the reference system defined by the optical elements. A first length measuring operation is schematically shown at 48. As can be seen, the lengths of the path traversed by the measuring beams 61-63 change when the measuring unit 50 was moved to another position or into another orientation relative to the reference system 65. By carrying out plural length measuring operations in which six lengths are determined in total, the relative position and orientation of the measuring unit 50 relative to the arrangement of optical elements 54-56 may be determined again.

When the first and second length measuring operations are carried out again, it is not required that the measuring beams are directed onto the same optical elements as in the length measuring operations which were carried out in another position or orientation of the measuring unit. Rather, the optical elements may respectively be selected in dependence on an estimate of the relative position and orientation such that there results an advantageous error propagation (i.e. an error propagation leading to small errors) in determining the relative position and orientation from the measured six lengths and/or such that a good signal-noise-ratio is guaranteed when detecting the measuring beams.

Various modifications of the length measuring operations described with reference to FIGS. 3 and 4 may be realized. While in FIG. 3 each one of the measuring beams 61-63 is scanned over different optical elements such that it is directed onto two different optical elements in the two length measuring operations, it is also possible that only part of the measuring beams 61-63 is scanned. For example, three length measuring operations may be performed in other embodiments in which at least one of the measuring beams is directed onto three different optical elements. This may for example be practical in cases when one of the locations 51-53 has a free line-of-sight to only one of the optical elements 54-56. In other embodiments, more than three optical elements and/or more than three locations from which the measuring beams are emitted may be provided.

While in FIGS. 3 and 4 a measuring system is shown in which the measuring unit is movable and the arrangement of optical elements is stationary in a lab system, in other embodiments the arrangement of optical elements may be attached to a movable object and the measuring unit may be mounted to be stationary. A characteristic distance between the locations 51-53 of the measuring unit at which the measuring beams are emitted is typically selected such that it is different from a characteristic distance between the optical elements 54-56. In particular, a configuration may be chosen in which the characteristic distance between the locations 51-53 is smaller than the characteristic distance between the optical elements 54-56 if the measuring unit is attached to a movable object. If the arrangement of optical elements is attached to a movable object, a configuration may be selected in which the characteristic distance between the locations 51-53 is greater than the characteristic distance between the optical elements 54-56. The characteristic distance may for example be defined as distance which is averaged over all pairs of locations or optical elements 54-56, respectively.

Different techniques may be used to guarantee a high stability and accuracy in determining the relative position and orientation. Stability against temperature variations may be attained by using suitable materials or by temperature-dependent corrections. Errors in determining distances between locations of the measuring unit at which measuring beams are emitted and optical elements may be attained by avoiding and/or correcting angle-dependent propagation time differences in the measuring unit. If an angle expansion optic is used, it can be configured such that angle-dependent propagation time differences are less than a predetermined threshold, for example less than 10 μm/c. Alternatively or additionally, the evaluation device of the measuring system may perform an angle-dependent propagation time correction with which propagation time differences in the optics of the transmitter units or transmitter-receiver-units are taken into account.

Figure 5:
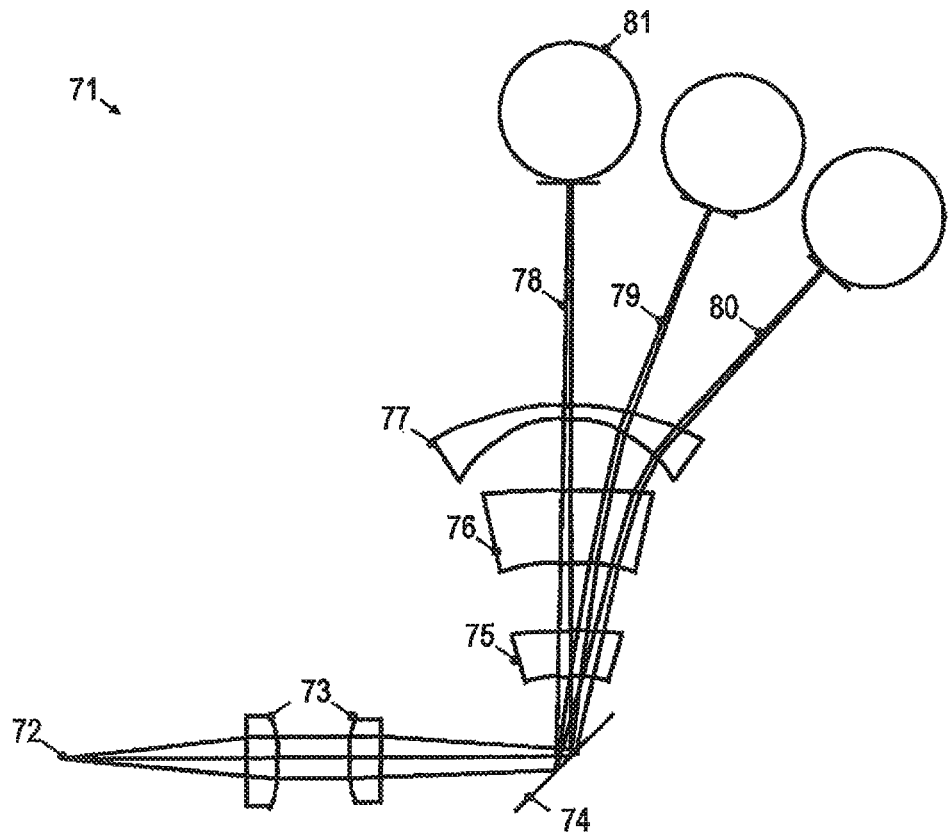
FIG. 5 is a schematic representation of optical components of a transmitter unit of a measuring unit according to an embodiment.

FIG. 5 is a representation which shows a possible arrangement 71 of optical components of a transmitter unit or a transmitter-receiver-unit in more detail. The arrangement of optical components shown in FIG. 5 may for example be used in the transmitter-receiver-unit of FIG. 2.

The arrangement 71 comprises a collimator 73 for collimating radiation which exits from a fiber end 72. A MEMS mirror 74 is provided to deflect the radiation in a controllable manner. An angle expansion optic having a plurality of lenses 75-77 is configured such that a measuring beam may be output over a sufficiently large angle range. Limitations of the adjusting range of the MEMS mirror 74 may thereby be compensated.

The collimator 73 and the angle expansion optic 75-77 is configured such that the measuring beam 78-80 emitted in different directions respectively impinges on only one optical element 81. The angle expansion optic 75-77 may be configured such that angle-dependent propagation time differences through the angle expansion optic 75-77 are less than a predetermined threshold.

While embodiments have been described in detail with reference to the drawings, modifications may be realized in various other embodiments. While measuring systems have been described in which the measuring unit is attached to a movable object, the measuring unit may for example also be provided so as to be stationary and the arrangement of optical elements may be provided on a movable object. While measuring units have been described in which each one of plural measuring beams is scanned over different optical elements in different length measuring operations, it is also possible that only part of the measuring beams are directed onto different optical elements in different length measuring operations.

The devices and methods according to various embodiments of the invention allow the relative position and orientation between a measuring unit and an arrangement of optical elements to be determined. Exemplary applications lie in installation engineering, in industrial production and in quality control.

The invention claimed is:

1. A measuring unit for determining a relative position and relative orientation between the measuring unit and an arrangement of at least three optical elements, the at least three optical elements being spaced apart from each other by known distances, the measuring unit comprising:
   a length measuring device comprising a length measuring head that emits measuring beams at at least three locations which are spaced apart from each other by known distances;
   at least one beam directing device comprising an adjustable optical element that directs the measuring beams onto the optical elements of the arrangement; and
   a control device to control the at least one beam directing device, the control device being operative to select the optical elements onto which the measuring beams are directed such that a solid angle defined by vectors between the locations at which the measuring beams are emitted and the optical elements onto which the measuring beams are directed is greater than a threshold;
   the at least one beam directing device being controllable to direct at least one of the measuring beams onto several optical elements of the arrangement in a time-sequential manner to perform plural length measuring operations in a time-sequential manner such that in the plural length measuring operations each measuring beam of the at least one measuring beam respectively impinges on only one of the optical elements; and wherein the length measuring head and the at least one beam directing device measure at least six lengths in total.

2. The measuring unit according to claim 1, wherein the length measuring head and the at least one beam directing device are configured such that each of the measuring beams has a beam cross-section in which at most one optical element is located.

3. The measuring unit according to claim 1, wherein the at least one beam directing device scans each one of the plural measuring beams over the optical elements of the arrangement in a time-sequential manner to perform the plural length measuring operations.

4. The measuring unit according to claim 3, wherein the length measuring head and the at least one beam directing device are configured such that in at least one of the plural length measuring operations the plural measuring beams are emitted simultaneously and directed onto the optical elements of the arrangement to simultaneously measure plural lengths.

5. The measuring unit according to claim 3, wherein the length measuring head and the at least one beam directing device are configured such that, in order to perform the plural length measuring operations, three measuring beams are scanned over plural optical elements of the arrangement to measure three lengths in each one of the plural length measuring operations.

6. The measuring unit according to claim 1, wherein the control device controls the at least one beam directing device in dependence on an estimate for the relative position and the relative orientation between the measuring unit and the arrangement of the optical elements such that the at least one measuring beam is scanned from one optical element to another optical element in a targeted manner.

7. The measuring unit according to claim 1, wherein the control device selects the optical elements onto which the measuring beams are directed such that close-by optical elements are preferred in the selection over optical elements which are further away.

8. The measuring unit according to claim 1, wherein at least three beam directing devices are provided for the measuring beams emitted at the at least three locations.

9. The measuring unit according to claim 8, wherein at least one of the beam directing devices comprises a micro-electro-mechanical device.

10. The measuring unit according to claim 8, wherein at least one of the beam directing devices comprises an angle expansion optic.

11. The measuring unit according to claim 10, wherein the angle expansion optic is configured such that a light propagation time through the angle expansion optic is substantially independent of angle and/or wherein an evaluation device determines the relative position and relative orientation from the at least six lengths computationally compensates angle-dependent differences in propagation time through the angle expansion optic.

12. The measuring unit according to claim 8, wherein at least one of the beam directing devices comprises a MEMS mirror.

13. A measuring system for determining a relative position and relative orientation between a measuring unit and an arrangement of at least three optical elements which are spaced apart from each other by known distances, the measuring system comprising:
the measuring unit according to claim 1; and
the arrangement of at least three optical elements;
wherein one of the measuring unit and the arrangement is provided in a stationary manner, and the other one of the measuring unit and the arrangement is provided on a moveable object.

14. The measuring unit according to claim 1, wherein the length measuring head comprises a collimation optic and a beam splitter.

15. The measuring unit according to claim 14, wherein the length measuring head further comprises at least one detector and a signal processor having an input coupled to the at least one detector.

16. A method for determining a relative position and relative orientation between a measuring unit comprising a measuring head and an arrangement of at least three optical elements, wherein the at least three optical elements are spaced apart from each other by known distances, the method comprising:
emitting measuring beams at at least three spaced-apart locations of the measuring unit, wherein the at least three locations are spaced apart from each other by known distances;
selecting the optical elements onto which the measuring beams are directed such that a solid angle defined by vectors between the locations at which the measuring beams are emitted and the optical elements onto which the measuring beams are directed is greater than a threshold;
directing the measuring beams onto optical elements of the arrangement;
wherein at least one of the measuring beams is directed onto plural optical elements of the arrangement in a time-sequential manner to perform plural length measuring operations in a time-sequential manner, wherein in the plural length measuring operations each measuring beam of the at least one measuring beam respectively impinges on only one of the optical elements; and
wherein at least six lengths are measured in total.

17. The method according to claim 16, which is performed using the measuring unit according to claim 1.

* * * * *